US007298288B2

(12) United States Patent
Nagy et al.

(10) Patent No.: US 7,298,288 B2
(45) Date of Patent: Nov. 20, 2007

(54) AUTOMATIC ADJUSTMENT OF BUBBLE UP RATE

(75) Inventors: Christopher J. Nagy, Waseca, MN (US); Christopher L. Osterloh, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 211 days.

(21) Appl. No.: 11/118,094

(22) Filed: Apr. 29, 2005

(65) Prior Publication Data

US 2006/0255965 A1 Nov. 16, 2006

(51) Int. Cl.
*G08B 23/00* (2006.01)

(52) U.S. Cl. .............. 340/870.02; 455/574; 455/127.5; 455/343.1

(58) Field of Classification Search ........... 340/870.02, 340/870.03; 455/574, 127.1, 127.5, 343.1
See application file for complete search history.

(56) References Cited

U.S. PATENT DOCUMENTS 4,614,945 A 9/1986 Brunius et al.
4,799,059 A 1/1989 Grindahl et al.
5,377,232 A 12/1994 Davidov et al.
5,448,230 A 9/1995 Schanker et al.
5,481,259 A * 1/1996 Bane ..................... 340/870.03
5,530,452 A 6/1996 Yokev et al.
5,553,094 A 9/1996 Johnson et al.
5,604,768 A 2/1997 Fulton
5,631,636 A 5/1997 Bane
5,874,903 A 2/1999 Shuey et al.
5,896,097 A 4/1999 Cardozo
5,953,371 A 9/1999 Rowsell et al.
6,088,659 A 7/2000 Kelley et al.
6,208,696 B1 3/2001 Giles
6,477,386 B1 11/2002 Giles
6,737,985 B1 5/2004 Garrard et al.
6,772,169 B2 8/2004 Kaplan
6,888,876 B1 5/2005 Mason, Jr. et al.

* cited by examiner

*Primary Examiner*—Albert K. Wong
(74) *Attorney, Agent, or Firm*—Patterson, Thuente, Skaar & Christensen, P.A.

(57) ABSTRACT

A method of operating an RF communicator adapted for an automatic meter reading (AMR) system includes maintaining the communicator in a low-power standby mode and automatically responding to bubble-up events that are spaced apart by time durations. The step of responding includes initiating the RF communicator to exit the standby mode and enter into an active operating mode, and thereafter return to the standby mode. A time duration between successive bubble-up events is automatically adjusted. One method of automatically adjusting a bubble up rate includes automatically setting the bubble-up rate to a relatively higher rate during a time of relatively high expectation of an occurrence of a communication attempt, and automatically setting the bubble-up rate to a relatively lower rate during a time of relatively low expectation of an occurrence of a communication attempt.

20 Claims, 6 Drawing Sheets

AUTOMATIC ADJUSTMENT OF BUBBLE UP RATE

FIELD OF THE INVENTION

The invention relates to communications systems and, more particularly, to a communications system utilizing an adaptive energy management scheme.

BACKGROUND OF THE INVENTION

Current automatic meter reading (AMR) systems include, as one of the major components of the system, a large number of endpoints, each endpoint being comprised of an ERT® (encoder, receiver, transmitter) that is interfaced to a utility meter. In a typical system, the ERT® obtains a consumption reading from the utility meter, such as consumption of water, gas, or electricity. A conventional endpoint which includes a communicator, such as a radio transceiver, transmits the consumption information to an intermediate receiver device according to the AMR system paradigm. In some endpoint applications, battery power is preferred. For example, gas or water meters that are battery-powered do not need to be connected to, and reliant upon, line power. Even electricity consumption meters, which are by their nature connected to the line power, can benefit from an independent power source. An independently-powered endpoint can inform the central utility about any occurrence of power outage or unauthorized tampering.

Battery-powered endpoints have been designed to limit the power consumed in day-to-day operation. One well-known design feature is a bubble-up mode of operation, in which an endpoint "bubbles-up," or activates its transceiver to communicate or attempt to communicate with the AMR data collection system, according to a preset schedule. The time duration or period between bubble-up events may typically span seconds or minutes.

Some AMR systems have a fixed, or installed, meter reading infrastructure that listens for transmissions from utility meter endpoints occurring on a bubble-up basis. In other systems, a typical endpoint bubbles up at a pre-set time to activate its receiver circuitry, which becomes receptive to a signal from an intermediate receiver or the like that prompts the endpoint to send the consumption reading to the reader or receiver. Some AMR systems utilize portable or vehicle-mounted reading devices that are transported along a meter reading route by utility personnel. A meter reading route is generally planned to pass within communications proximity to the utility meters to be read. Some AMR systems use a combination of fixed and mobile meter reading devices where, for example, the fixed devices communicate with endpoints at regular scheduled intervals, and the mobile devices communicate with selected endpoints on an as-needed basis.

Utility meters are generally read on periodic intervals, such as hourly, daily, weekly, monthly, etc. The meter reads may occur at regularly spaced, pre-determined times in each period such as, for example, on the first day of each month. A challenge for systems designers is accommodating a common practice among utilities to vary the meter reading frequency of each occurrence. Variations may be due to factors such as scheduling changes, migration to different AMR systems, work backlogs, downtime, and the like. For example, a utility may ordinarily request information from a given meter on a semi-monthly basis during one portion of the year, and on a weekly basis during another portion of the year. It is also common practice among utilities to take readings from utility meters, and return to a particular area shortly thereafter to request additional data or repeated data from certain utility meters. Therefore, actual communication between meter and reader does not necessarily take place on a consistent schedule.

A short bubble up cycle (a high bubble-up frequency) can improve system performance by creating a greater likelihood of achieving communications between a utility meter endpoint and a receiver (or reader). In a situation in which a mobile reader follows a route that passes near a given meter, there exists a narrow window of opportunity for the meter endpoint to successfully interface with the reading device during the time that the reader is within communications proximity to the meter. Therefore, one challenge associated with bubble-up operation is pre-setting a frequency for bubble-up events. System designers must trade off system communications reliability, which is improved with more frequent bubble-ups, against battery-powered endpoint energy consumption, which is improved with less frequent bubble-ups.

SUMMARY OF THE INVENTION

The above summary of the invention is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
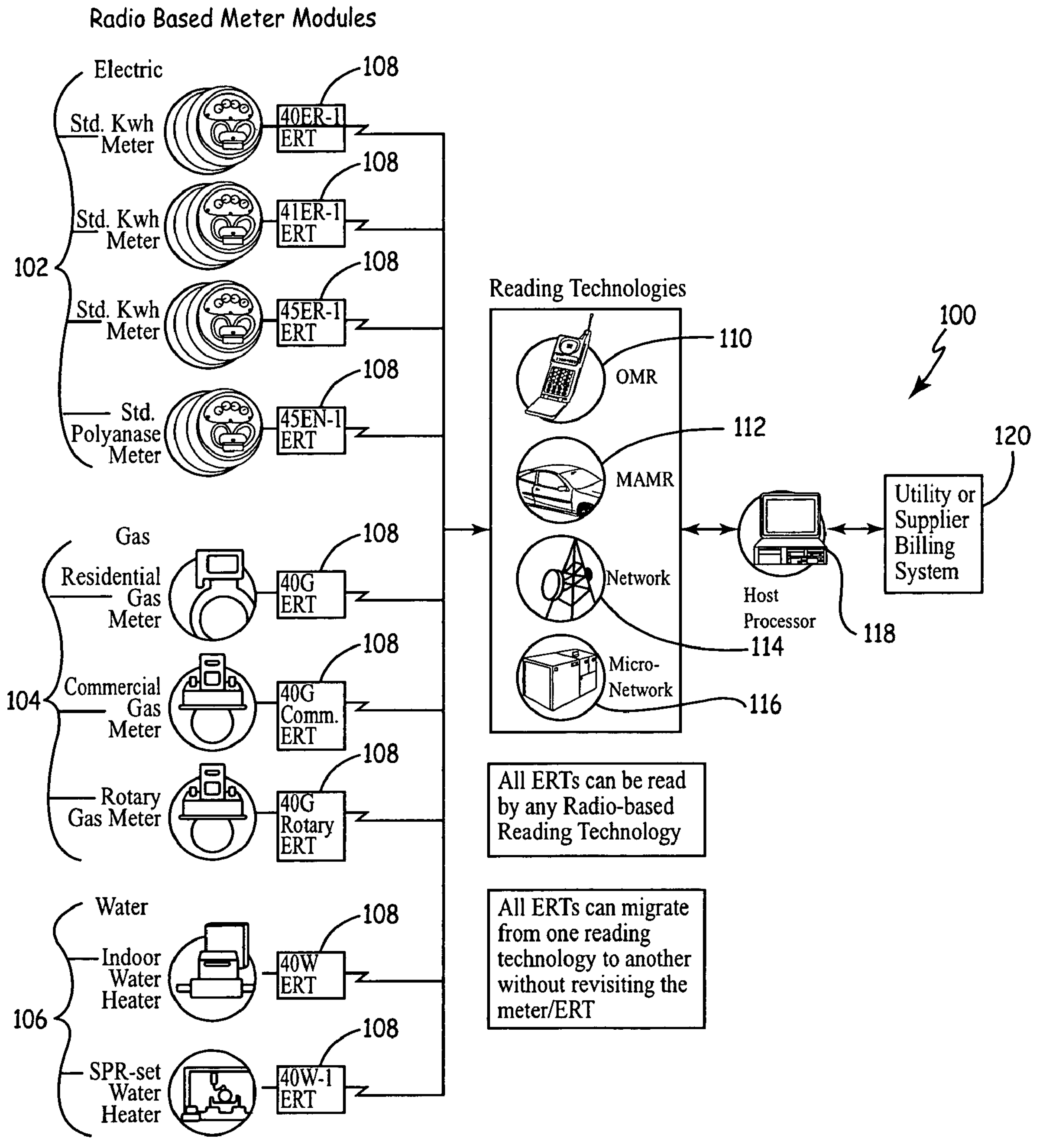
FIG. 1 depicts a radio-based automatic meter reading system that utilizes the data communication protocol according to one aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

One aspect of the invention is generally directed to an operating mode for devices that work with automatic meter reading (AMR) systems. In one example application, a bubble-up operating mode according to one embodiment of the invention is implemented in utility meter endpoint devices that are a part of an AMR system. While the invention is not necessarily limited to such an application, the invention will be better appreciated using a discussion of example embodiments in such a specific context.

AMR system 100, as depicted in FIG. 1, utilizes the invention which includes at least one utility measurement device including, but not limited to, electric meters 102, gas meters 104 and water meters 106. Each of the meters may be either electrically or battery powered. The system further includes at least one endpoint (or ERT®) 108, wherein each corresponds and interfaces to a meter. Each of the endpoints (or ERT®) 108 preferably incorporates a radio frequency (RF) device, e.g., the Itron, Inc. ERT®. The system additionally includes one or more readers, which may be fixed or mobile, as depicted in FIG. 1 to include: (1) a mobile hand-held reader 110, such as that used in the Itron Off-site meter reading system; (2) a mobile vehicle-equipped reader 112, such as that used in the Itron Mobile AMR system; (3) a fixed radio communication network 114, such as the Itron Fixed Network AMR system that utilizes the additional components of cell central control units (CCUs) and network control nodes (NCNs); and (4) a fixed micro-network system, such as the Itron Micronetwork AMR system that utilizes both radio communication through concentrators and telephone communications through PSTN. Of course, other types of readers may be used without departing from the spirit or scope of the invention. Further included in AMR system 100 is a head-end, host processor 118 that incorporates software that manages the collection of metering data and facilitates the transfer of that data to a utility or supplier billing system 120.

In AMR system 100, endpoints 108 can support one-way meter reading, 1.5-way meter reading, or two-way meter reading systems. A one-way meter reading system provides a reader that listens to messages sent asynchronously from each endpoint. In a one-way meter reading system, endpoints do not need to receive any information from the reader. In a 1.5-way meter reading system, the reader sends prompting signals to endpoints, which, in turn, listen for, and respond to the prompting signals by simply transmitting their messages. In a two-way meter reading system, endpoints also listen for, and respond to prompting signals issued by the reader. In addition, a two-way meter reading system enables the reader to communicate with and command the endpoint while also enabling the endpoint to respond to the reader's communications and commands.

Figure 2:
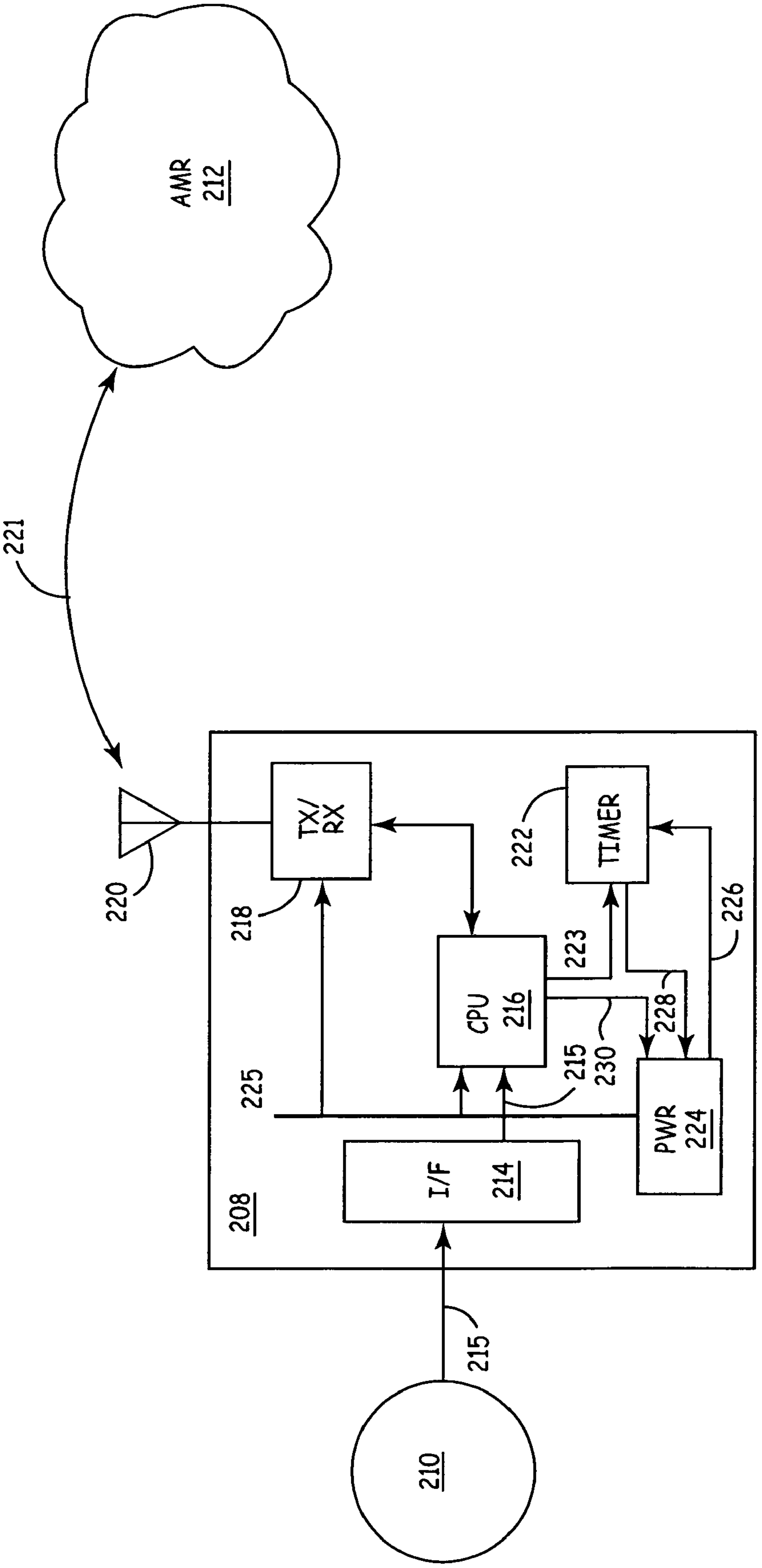
FIG. 2 is a diagram illustrating a utility meter endpoint according to one embodiment of the invention.

FIG. 2 illustrates one embodiment of a utility meter endpoint 208. Endpoint 208 interfaces with a utility meter 210, receives consumption and other relevant data from utility meter 210, and communicates the data to AMR system 212. Endpoint 208 includes an interface system 214, which operatively couples to utility meter 210 via coupling 215. In one embodiment, coupling 215A includes electrical and mechanical components for making a physical and electrical connection between utility meter 210 and endpoint 208. For example, coupling 215A can include electrical connectors and conductors that carry electrical signals from utility meter 210 to interface hardware in interface system 214 that converts the electrical signals into a digital representation that is readable by a CPU 216. Interface system 214 is, interfaced with CPU 216 via interface 215B. In one embodiment, interface 215 includes a portion of a data bus and of an address bus.

In this example embodiment, CPU 216 is a controller that oversees operation of endpoint 208. In one embodiment, CPU 216 includes a microprocessor system that has memory, instruction processing, and input/output circuits. CPU 216 interfaces with radio transceiver 218 via interface 217. In one embodiment, interface 217 includes a portion of a data bus and of an address bus, which is then coupled to an antenna 220. In operation, interface hardware 214 forwards and converts utility meter data for further processing by CPU 216. CPU 216 processes and stores the data at least temporarily, and instructs transceiver 218 to communicate the metered data to AMR system 212 at appropriate times.

Endpoint 208 operates in a low-power standby mode during a majority (>50%) of the time. While in the standby mode, interface system 214, CPU 216, and transceiver 218 are effectively shut down to reduce power consumption. Timer 222 operates to periodically wake up the shut-down systems so that they enter into an active operating mode. In one embodiment, timer 222 is an independent circuit that is interfaced with CPU 216. In another embodiment, timer 222 is implemented as a watchdog timer in a microcontroller that is a part of CPU 216. In either embodiment, one feature of timer 222 is that timer 222 consumes relatively little energy for operating. Also, upon expiration of a settable time duration set into timer 222, timer 222 provides a signal that initiates bringing online the systems that are in standby mode. In a related embodiment, the settable time duration is set in timer 222 by CPU 216 via a setup signal 223. For example, setup signal 223 can be carried via a data bus.

According to one example embodiment, endpoint 208 includes a power supply 224. In one embodiment, power supply 224 includes one or more batteries. Power supply 224 provides conditioned power to interface system 214, CPU 216, and transceiver 218 via a switchable power bus 225. Power supply 224 provides conditioned power to timer 222 via a power line 226. Timer 222 provides a control signal 228 to power supply 224 that causes power supply 224 to apply power to power bus 225. CPU 216 provides a control signal 230 to power supply 224 that causes power supply 224 to remove power from power bus 225. In operation, beginning in a standby mode, timer 222 has been configured with a set time duration by CPU 216 via setup signal 223. Timer 222 monitors the passing of the time duration and, at the expiration of the time duration, timer 222 provides a signal to power supply 224 to energize power bus 225. Once power is applied via power bus 225 to CPU 216, interface system 214, and transceiver 218, CPU 216 begins executing a program that gathers data from utility meter 210 via interface system 214, and momentarily activates transceiver 218. Once the data gathering program is complete, CPU 216 sets a time duration into timer 222 and initiates the clock while generating a timing, and generates a control signal 230 to power down the systems that have been powered via power bus 225.

The operation cycle described above is one example of endpoint activity during a bubble-up event. In a related embodiment, during each bubble-up event, transceiver 218 transmits the utility meter data via wireless communication 221. In this embodiment, the AMR system is presumed to be in a continuous receptive state to transmissions by endpoints. In another related embodiment, during each bubble-up event, transceiver 218 enters into a receptive operating mode, and forwards received signals to CPU 216 for analysis. CPU 216 then determines whether to respond to any received signal.

In one example embodiment, CPU 216 is programmed to respond to a valid pseudo-noise (PN) sequence that includes a wakeup preamble. Receipt by CPU 216 of a valid PN sequence initiates communication 221 between endpoint 208 and AMR system 212. In this example embodiment, AMR system can communicate any number of instructions, configuration changes, requests for data transmission, or the like, to endpoint 208.

In one embodiment, setup signal 223, at different times, can set timer 222 with different time durations. In effect, these different time durations cause the time between bubble-up events to be different. The inverse of the time duration between bubble-up events, the inverse of the period of each bubble-up cycle, or the repetition rate (or frequency) of bubble-up events, shall be generally referred to herein as bubble-up rate.

In a related embodiment, the bubble-up rate is set and varied by CPU 216. Varying the bubble-up rate can be advantageous in certain applications. One such application, in which varying the bubble-up rate is useful for extending battery life without substantially compromising communications performance, is described below. Persons skilled in the art will appreciate that there may be other applications in which automatically varying the time between bubble-up events is useful.

In one application, a battery-powered endpoint, such as utility meter endpoint 208, utilizes a variable bubble-up rate for communicating with a fixed AMR system that generally initiates communication with endpoints according to scheduled communication times. For example, scheduled communication times can be maintained according to a policy instituted by the utility provider in which each endpoint is read every fourteen (14) days. In a more flexible example communication policy, during each communication the AMR system informs each endpoint of the date/time of, or the time interval until, the next communication attempt. In this example application, it is desirable to conserve battery energy between communication attempts. To this end, in one embodiment, utility meter 208 bubbles-up more frequently around the time of an expected communication attempt, and bubbles-up less frequently at other times.

Figure 3A:
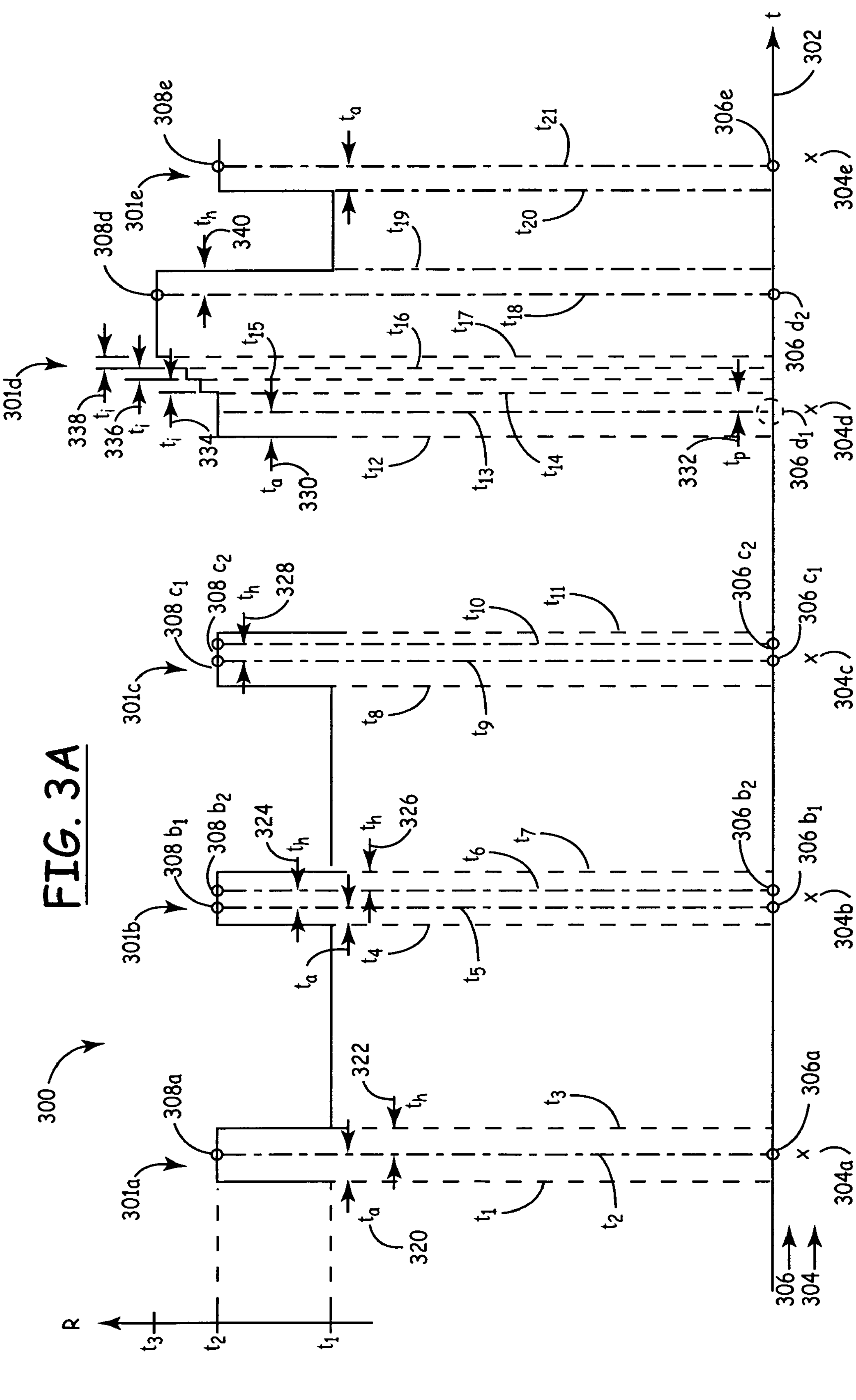
FIG. 3A is a timing diagram illustrating example operation modes of a utility meter endpoint device operating according to one embodiment of the invention.
Figure 3B:
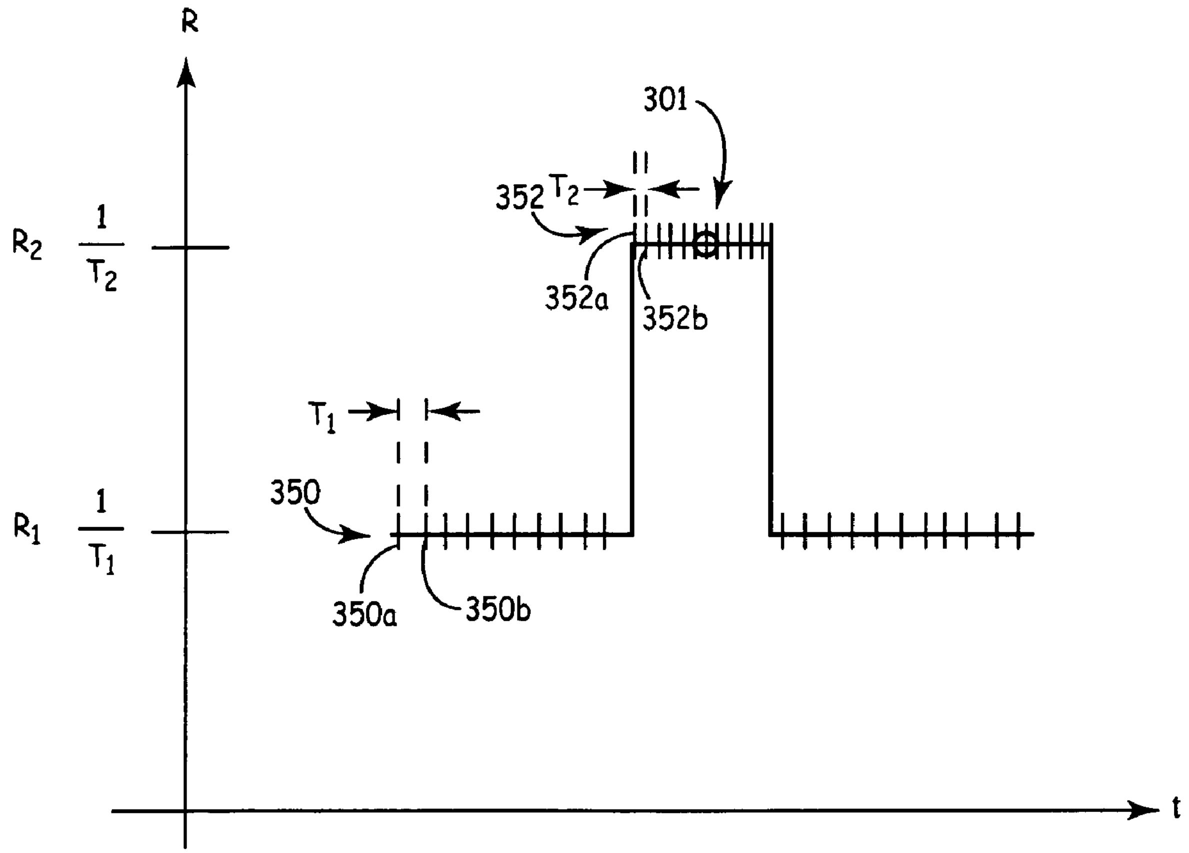
FIG. 3B is an expanded detailed view of a portion of the timing diagram of FIG. 3A.

Referring now to FIGS. 3A and 3B, FIG. 3A illustrates an example bubble-up rate profile 300. Bubble-up rate profile 300 represents the varying bubble-up rate as a function of time t. A reference timeline 302 is provided, along with reference time instances $t_1$-$t_{21}$, which correspond to occurrences of various events described below. Bubble-up rate profile 300 is formed during operation of endpoint 208 as endpoint 208 adjusts its bubble-up rate. Endpoint 208 adjusts its bubble-up rate according to the following rules:

1. Endpoint 208 anticipates the time of the next communication attempt.
2. Endpoint 208 normally operates at a minimum bubble-up rate.
3. For a predetermined time $t_a$ prior to the next expected communication attempt, endpoint 208 begins operating at a predetermined higher bubble-up rate.
4. For a predetermined time $t_h$ after each completed communication attempt, endpoint 208 maintains the higher bubble-up rate, and then returns to the minimum bubble-up rate. The maintained higher bubble-up rate accommodates the common practice of the AMR system initiating follow-up communications.
5. If an expected communication does not occur, after a predetermined time $t_p$, endpoint 208 increments the bubble-up rate, in steps having time duration $t_1$, up to a maximum bubble-up rate, which is maintained until a successful communication occurs. This rule is useful if a communication fails to occur at the scheduled time due to difficulty establishing communication with endpoint 208. The rule is designed to increase the probability of a successful communication by increasing the bubble-up rate.

Bubble-up rate profile 300 includes periods 301*a*-301*e* (referred to generally as periods 301) during which bubble-up rate R is at relatively higher rates, such as rates $R_2$ and $R_3$. During periods other than periods 301, bubble-up rate R is at a relatively lower at a rate of $R_1$. FIG. 3B illustrates the relationship between the bubble-up rate R and bubble-up events. Bubble-up events are indicated generally at 350 and at 352. Each bubble-up event 350, 352 includes an operation cycle of endpoint 208 in which endpoint 208 enters an active operating mode from a low power standby mode, performs designated functions, such as activating transceiver 218 and possibly communicating with AMR system 212, and returns to the low power standby mode. Bubble-up events 350, including individual bubble-up events 350*a* and 350*b*, occur at an interval $T_1$. Bubble-up events 352, including 352*a* and 352*b*, occur during period 301 and have an interval $T_2$, which is shorter in time relative to interval $T_1$. Bubble-up rate $R_1$ of bubble-up events 350 is $1/T_1$. Bubble-up rate $R_2$ of bubble-up events 352 is $1/T_2$. In one embodiment, periods $T_1$, and $T_2$ are on the order of seconds, or tens of seconds.

Endpoint 208 expects communication attempts at certain time instances. In one embodiment, at any instant in time, endpoint 208 expects only the next future communication attempt. In another embodiment, endpoint 208 maintains the current date/time, and expects one or more future events at defined times. Referring again to FIG. 3A, communication attempts that are expected by endpoint 208 are each marked with an "X" corresponding to the time at which each event is expected, and indicated generally at 304. For example, expected communication attempt 304*a* is expected to occur at time $t_2$. Actual communications attempted by AMR system 212 are each represented by an "O" marked on timeline 302, and indicated generally at 306. Thus, communication attempt 306*a* coincides in time with expected communication attempt 304*a* at time $t_2$. Successful communications are each represented by a "dot" and indicated generally at 308. For example, successful communication 308*a* coincides in time with expected communication attempt 304*a* and actual communication attempt 306*a* at time $t_2$. In one embodiment, a successful communication is defined by endpoint 208 receiving a valid command and control frame from AMR system 212.

Bubble-up rate profile 300, during the time preceding $t_1$, remains at a constant minimum bubble-up rate $R_1$. At time $t_1$, and in anticipation of expected communication attempt 304*a* occurring at time $t_2$ (according to Rule 3 described above), endpoint 208 increases the bubble-up rate to rate $R_2$ for a time duration $t_a=t_2-t_1$ (indicated at 320). Increased bubble-up rate $R_2$ creates conditions in which an occurrence of a successful communication is more probable. In this example, the time duration between $t_a$ corresponds to a preconfigured anticipatory period that has been selected to accommodate some degree of variation between the actual and expected times of each communication attempt. At time $t_2$, communication attempt 306*a* occurs as expected, and results in successful communication 308*a*. At time $t_3$, endpoint 208 reduces its bubble-up rate back to rate $R_1$. During the time immediately following a communication, there is typically an increased likelihood that a follow-up communication will occur. To facilitate such follow-up communication attempts, for a time duration $t_h$ (indicated at 322) between $t_3$ and $t_2$, bubble-up rate profile 300 remains at increased rate $R_2$ pursuant to Rule 4 described above. In one embodiment, the time duration $t_h$ to maintain increased bubble-up rate $R_2$ after each communication event 308 is pre-configured in the control software of endpoint 208. In a related embodiment, time duration $t_h$ can be varied to accommodate changes in a utility's AMR practices.

Example events during period 301*b* (FIG. 3A) illustrate one approach to responding to a follow-up communication directed at endpoint 208. In the time preceding time $t_4$, endpoint 208 expects a communication 304*b* at time $t_5$. Accordingly, at time $T_4$, endpoint 208 increases its bubble-up rate from $R_1$ to $R_2$ pursuant to Rule 3 described above. An actual communication 306*b*$_1$, occurs at time $t_5$, and results in a successful communication 308*b*$_1$. Following communication 308*b*$_1$, the bubble-up rate remains at $R_2$ for a holding time $t_h$ (indicated at 324) according to Rule 4 described above. Before expiration of time period $t_h$ 324, another communication attempt, 306*b*$_2$, occurs at time $t_6$, and results in successful follow-up communication 308*b*$_2$. A new holding time period $t_h$ 326 begins at time $t_6$, and extends until time $t_7$, at which time the bubble-up rate is decreased back to rate $R_1$.

Example events during period 301*c* illustrate another approach to dealing with a follow-up communications. At time $t_9$, a successful communication 308*c*$_1$ occurs. For a time period $t_h$, as indicated at 328, the bubble-up rate is maintained at increased rate $R_2$. Before expiration of time period $t_h$ 328, a follow-up communication 308*c*$_2$ occurs at time $t_{10}$. However, unlike the example events described above with respect to time period 301*b*, follow-up communication 308*c*$_2$ does not cause endpoint 208 to wait an additional time duration $t_h$ before reducing the bubble-up rate back to $R_1$. Thus, the bubble-up rate returns to rate $R_1$ at time $t_{11}$, which occurs at a time duration $t_h$ following successful communication 308*c*$_1$. This example approach can be useful when additional follow-up communications are considered unlikely soon after an initial follow-up communication such as communication 308*c*$_2$.

Example events during period 301*d* illustrate one approach of dealing with situations where an expected communications event fails to occur within an expected time period. Expected communication attempt 304*d* is anticipated to occur at time $t_{13}$. Pursuant to Rule 3 described above, at time $t_{12}$, which is time duration $t_a$ 330 before expected communication attempt 304*d*, bubble-up rate R is increased to $R_2$. However, around time $t_{13}$, a successful communication does not occur. This failure may be due to failure of the AMR system to attempt communication. Alternatively, the failure may be due to a failure to receive an attempted communication 306*d*$_1$ by endpoint 208. Pursuant to Rule 5 described above, endpoint 208 maintains the bubble-up rate R for a preconfigured time $t_p$ after the time of expected communication attempt 304*d*. Thus, beginning at time $t_{13}$, endpoint 208 begins measuring time duration $t_p$. At the end of time duration $t_p$ (time $t_{14}$), endpoint 208 increments bubble-up rate R pursuant to Rule 5 described above, and maintains the rate for a time duration $t_i$, indicated at 334 until time $t_{15}$. At times $t_{15}$-$t_{16}$ bubble-up rate R is sequentially incremented for durations $t_i$ (336, 338). At time $t_{17}$, bubble-up rate R is incremented up to maximum rate $R_3$ and maintained at $R_3$. At time 318, a communication attempt 306*d*$_2$ results in successful communication 308*d*. In response, endpoint 208 maintains bubble-up rate R for a time duration $t_h$ 340 to accommodate any potential follow-up communications and is then reduced back to minimum bubble-up rate $R_1$ at time $t_{19}$.

In one example embodiment, following a delayed communication such as communication 308*d* described above, endpoint 208 expects the next communication attempt 304*e* to occur according to a predetermined schedule that does not take into account any delay in the previous communication 308*d*. In another embodiment, the next expected communication attempt 304*e* is expected to occur at a different time that accounts for the delay of the earlier communication 308*d*. In either case, at time $t_{20}$, in anticipation $t_a$ of expected communication 304*e*, bubble-up rate R is increased to rate $R_2$ to facilitate communication attempt 306*e* resulting in successful communication 308*e* at time $t_{21}$.

Figure 4:
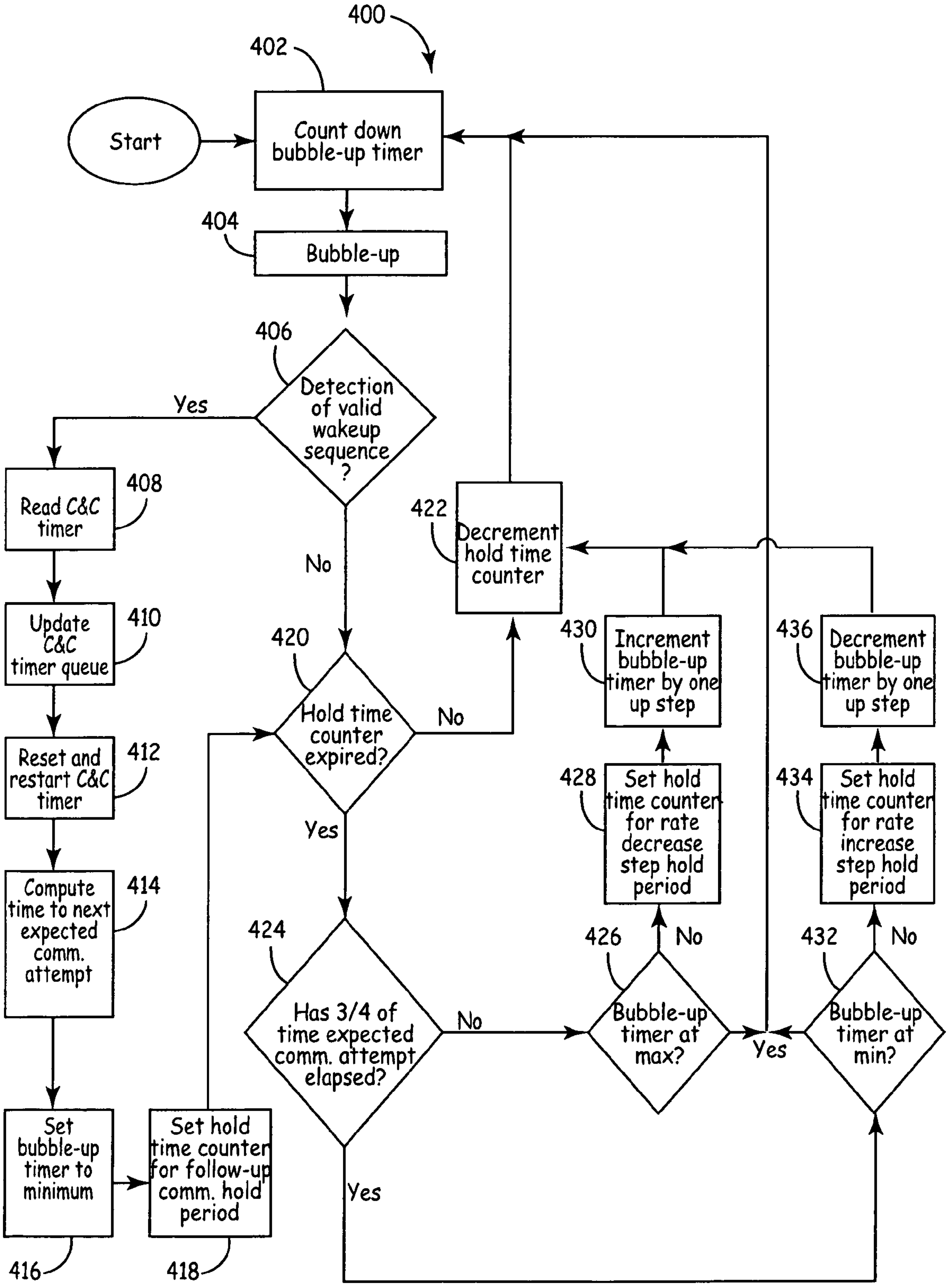
FIG. 4 is a flow diagram illustrating an example operation cycle of an endpoint device operating according to one embodiment of the invention.

FIG. 4 illustrates an example operation cycle 400 of an endpoint device that utilizes an adaptive variable bubble-up rate according to one embodiment of the invention. The bubble-up rate in this example is adaptive in the sense that the rate automatically adjusts in response to potentially changing AMR practices. An example endpoint device implementing operation cycle 400 utilizes three timers: (1) a bubble-up timer, (2) a command and control frame (C&C) timer, and (3) a hold time counter. The bubble-up timer is analogous to timer 222 (FIG. 2) that controls the initiation of each bubble-up event. In one embodiment, bubble-up events occur every 15 seconds.

In one example embodiment, the bubble-up timer counts down from a set time duration representing the bubble-up period and, upon expiration of the set time duration, generates a signal that causes the endpoint device to begin bubbling up. However, persons skilled in the art will appreciate that the bubble-up timer can be configured any number of ways to provide a reference time duration. For example, the bubble-up timer can be configured to count from a first value to a second value based on a reference timing signal. In one example embodiment, the bubble-up timer is implemented with an electronic counter circuit that is clocked by a timing signal of a known frequency. In an alternative embodiment, the bubble-up timer is implemented by a microcontroller running a software program. In the example embodiment described below, the bubble-up timer is configured so that it has a minimum set point and a maximum set point. Otherwise, the bubble-up timer can be set to various time durations within the range defined by the minimum and maximum set points.

The C&C timer measures the time between valid command and control frames, which represents the time between successive, successful communication events involving the endpoint device. The time between command and control frames is generally long enough to include a large plurality of bubble-up cycles. For example, in one embodiment, the C&C timer represents 30.5 days. In another example embodiment, the C&C timer is implemented with an electronic counter circuit that is clocked by a timing signal of a known frequency. In an alternative embodiment, the C&C timer is implemented by a microcontroller running a software program.

The hold time counter provides a reference hold period during which the bubble-up rate is maintained at its set level. The hold period is generally long enough to include a smaller plurality of bubble-up cycles. For example, in one embodiment, the hold period is 24 hours. In one example embodiment, the hold time counter is implemented as an electronic counter circuit clocked by a known timing signal. In another embodiment, the hold time counter is implemented in software running on a microcontroller. In example operation cycle 400 described below, the hold time counter counts occurrences of bubble-up events from a preset maximum M, to zero, at which point the hold time is reached. Timing is achieved in this arrangement because each bubble-up cycle takes a certain amount of time T. Thus, the hold period is equal to M*T time units. In example operation cycle 400, the hold time counter can be set to represent three potentially different time periods: (1) a follow-up communication hold period, (2) a bubble-up rate decrease step hold period, and (3) a bubble-up rate increase step hold period. The use of these time periods is described below.

During a majority of the time, the endpoint device operating according to operation cycle 400 is in a low-power standby mode between bubble-up events. In this mode, indicated at 402, the bubble-up timer is counting down to the next bubble-up event. In one example embodiment, the bubble-up timer is a digital counter circuit that counts down to zero from a set value based on a clocking signal having a known frequency. However, persons skilled in the art will recognize that the bubble-up timer can be implemented any number of ways within the spirit of the invention. For example, the bubble-up timer can be implemented as a counter that counts up to a second set value from a first set value. Also, the bubble-up timer can be implemented with a microprocessor running a software program.

At 404, the bubble-up timer expires, or indicates that the set time duration has elapsed. In response, the endpoint device begins performing the various functions associated with a bubble-up event, such as receiving utility meter data, activating the transceiver circuit, potentially engaging in communications with an AMR system, and the like. In one example embodiment, the bubble-up event also includes the activities described below to adaptively configure the endpoint device for the next bubble-up operation cycle.

At 406, the endpoint device determines whether or not a successful communication has occurred during the present bubble-up cycle. If a valid wakeup sequence was detected (indicating a successful communication), at 408, the C&C timer is read. As described above, the C&C timer measures the time duration between valid command and control frames. In one embodiment, the endpoint device maintains a log of C&C timer measurements. In one example embodiment, the most recent 12 measurements are kept in a first-in-first-out (FIFO) queue. At 410, the most recent measurement made at 408 is entered into the queue, and the least recent entry in the queue is purged. At 412, the C&C timer is reset and restarted.

The time between successful communications is useful for estimating the time of the next expected communication attempt. At 414, the next expected communication attempt is computed. One method of computing the next expected communication attempt involves taking an average of the logged C&C timer measurements. In one example embodiment, where 12 measurements are stored in queue, the two highest and two lowest values are discarded prior to averaging the remaining 8 values. By utilizing a running average to predict each next expected communication attempt, the endpoint device will adapt to changing AMR practices.

At 416, also in response to the detection of the valid wakeup sequence, the bubble-up timer is set to its minimum value, thereby causing the endpoint device to bubble-up at the highest allowed bubble-up rate. In one example embodiment, the minimum bubble-up timer setting is 5 seconds. At 418, the hold time counter is set to represent a time duration referred to above as the follow-up communication hold period. During the follow-up communication hold period, the endpoint maintains a maximum bubble-up rate to maintain the highest probability of achieving a successful follow-up communication between the endpoint device and the AMR system. The follow-up communication hold period is analogous to time duration $t_h$ described above with reference to FIG. 3A. At 420, regardless of whether a valid wakeup sequence was detected at 406, the endpoint device determines if the hold time counter has expired. If the hold time counter has not expired, the hold time counter is decremented at 422, and operation cycle 400 is repeated at the maximum bubble-up rate. If the hold time counter has expired, this indicates that the bubble-up rate can be reduced to conserve energy. At this point, it is implicit that occurrence of a communication event has become less likely.

In example operation cycle 400, the bubble-up rate is varied according to preconfigured steps. Accordingly, when it is time to increase or decrease the bubble-up rate, the rate is changed by a specific amount, resulting in a new bubble-up rate. The new bubble-up rate is maintained for a minimum time, or for a minimum number of bubble-up events. The hold time counter is used to determine the duration of each step. The size of steps increasing the bubble-up rate can be different from the steps decreasing the bubble-up rate.

When the bubble-up profile is at a point where the bubble-up rate can be changed (i.e. when the hold timer has expired), endpoint device first determines the direction of the bubble-up rate change. In example operation cycle 400, at 424, the endpoint device determines the direction of the bubble-up rate change by testing whether ¾ of the time until the next expected communication attempt has elapsed. At ¾ of the time until the next expected communication attempt and later, there is an increasing likelihood that a communications attempt will occur. Thus, if ¾ of the time until the next expected communication attempt has not elapsed, the endpoint device takes steps to decrease the bubble-up rate by correspondingly incrementing the bubble-up timer. Thus, at 426, the endpoint device determines whether the bubble-up timer is already set at its maximum limit. If it is, then there is no need to further increment the bubble-up timer, and the operation cycle is repeated. If, however, the bubble-up timer is not at its maximum limit, then, at 428, the hold time counter is set to represent the bubble-up rate decrease step hold period. Next, at 430, the bubble-up rate is incremented by a step size associated with incrementing the bubble-up rate. In one example embodiment, this "up" step size is 1 second.

In the next sequential cycle 400, the hold timer will not have expired at 420. Thus, the timer will be decremented towards its expiration and the cycle will repeat. After expiration of the hold time counter, the bubble-up timer will be incremented towards its maximum limit. Eventually, the bubble-up timer will remain at its maximum limit until ¾ of the time until the next expected communication event elapses (determined at 424).

After ¾ of the time until the next expected communication event has elapsed, the endpoint device begins incrementing the bubble-up rate by correspondingly decrementing the bubble-up timer at 432, 434, and 436. As the current time approaches the time of the next expected communications attempt, the probability of an actual communications attempt occurring, increases. Accordingly, at 432, the endpoint device determines whether the bubble-up timer is already set at its minimum limit. If it is, then there is no need to further decrement the bubble-up timer, and the operation cycle is repeated. If, however, the bubble-up timer is not at its minimum limit, then, at 434, the hold time counter is set to represent the bubble-up rate increase step hold period. Next, at 436, the bubble-up rate is incremented by a step size associated with decrementing the bubble-up rate. In one example embodiment, this "down" step size is 2 seconds. Eventually, the bubble-up timer will reach its minimum setting and remain at that setting until a follow-up communication hold period after the next successful communications event.

Figure 5:
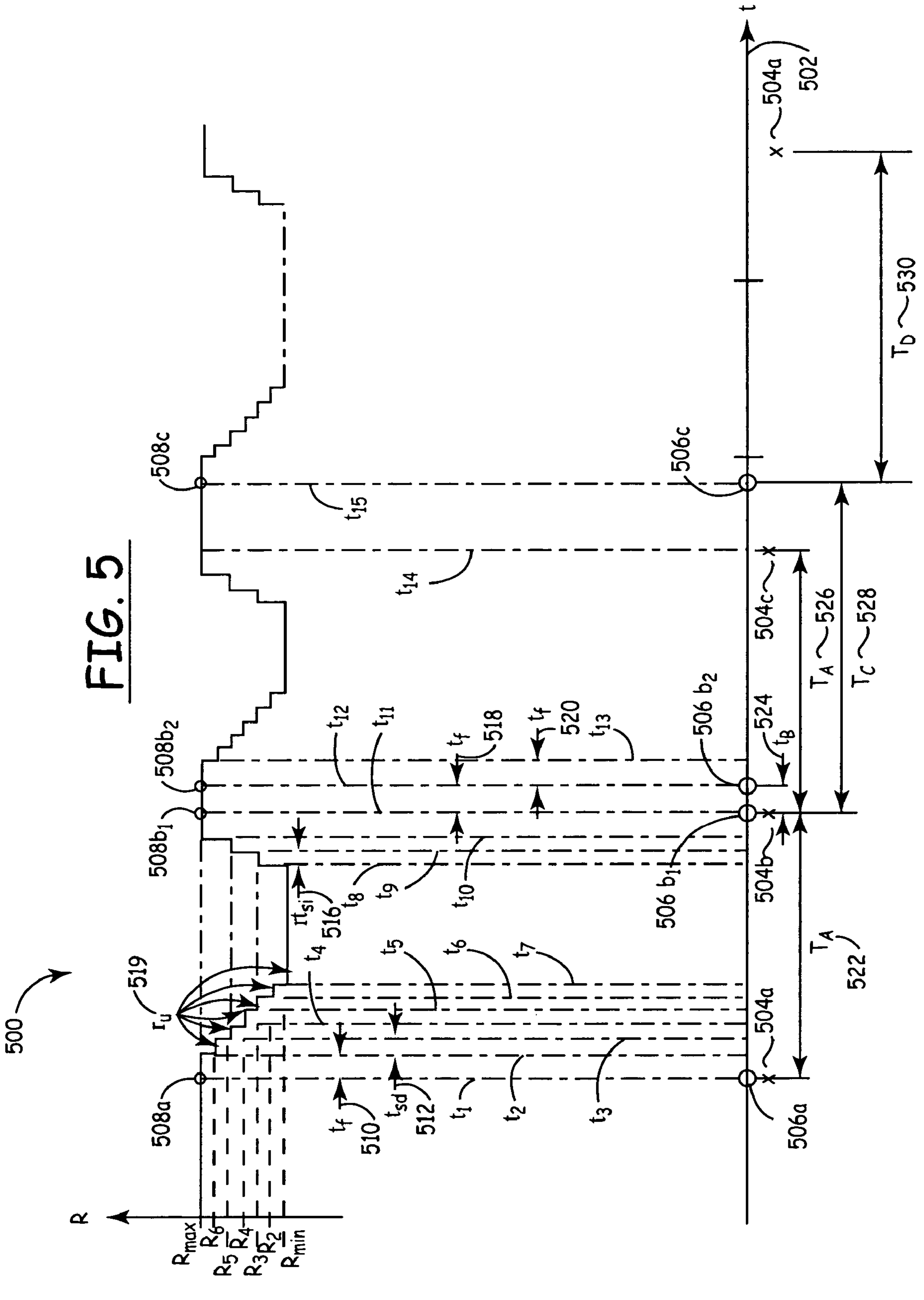
FIG. 5 is a timing diagram illustrating example operation modes related to the example operation cycle of FIG. 4.

FIG. 5 illustrates an example bubble-up rate profile 500 that is produced by operation of an endpoint device utilizing example operation cycle 400 described above. In this embodiment, the bubble-up rate R is varied according to the expectation level of an upcoming communication attempt. Example operation profile is plotted against time axis 502. Expected communication attempts are indicated respectively at 504*a*-504*d*, and are referred to generally as expected communication attempts 504. Actual communication attempts are indicated generally at 506, while actual successful communications events are indicated generally at 508. Bubble-up rates Rmin, Rmax and R2-R6, are plotted along the vertical bubble-up rate axis R. Rate Rmin represents the minimum bubble-up rate, which corresponds to the maximum bubble-up timer setting above with referenced in FIG. 4. Rate Rmax represents the maximum bubble-up rate, which corresponds to the minimum bubble-up timer setting discussed above with reference to FIG. 4.

Example bubble-up rate profile 500 represents bubble-up rate R varying over time within rate limits Rmax and Rmin. At time prior to t1, bubble-up rate R is at rate Rmax in expectation of expected communication attempt 504*a*. At time t1, communication attempt 506*a* occurs, resulting in successful communication 508*a*. During a bubble-up event, pursuant to detection 406 of example operation cycle 400 (FIG. 4), the endpoint device detects a valid wakeup sequence contained in the communication attempt 506. The endpoint device proceeds to calculate the time of next expected communication event 504*b*.

During follow-up communication hold period $t_f$ 510, the endpoint device maintains the bubble-up rate R at $R_{max}$. After the expiration of the follow-up communication hold period $t_f$ 510, the probability of another communication attempt begins to decrease and the endpoint device can have a lesser expectation of such an event occurring. Therefore, the bubble-up rate may be decreased to conserve energy. Accordingly, at time $t_2$, the hold period expires, and the endpoint device begins to step down bubble-up rate R. The hold time counter is re-set to rate decrease step hold period $t_{sd}$ 512. Rate decrease step hold period $t_{sd}$ 512 is tolled beginning at time $t_2$. At time $t_3$, rate decrease step hold period $t_{sd}$ 512 expires. During time period $t_3$-$t_2$, the bubble-up rate R is maintained at rate $R_6$. This step-wise bubble-up rate reduction is continued sequentially, as depicted in FIG. 5, for the time periods $t_4$-$t_3$, $t_5$-$t_4$, $t_6$-$t_5$, and $t_7$-$t_6$bubble-up rate R is set respectively to $R_5$, $R_4$, $R_3$, and $R_2$. Each bubble-up rate decrease is achieved by incrementing the bubble-up timer by one up step, pursuant to 430 (FIG. 4). In this example, each timer up step is designated as $r_u$, in FIG. 5, and indicated at 514. At time $t_7$, the bubble-up rate reaches pre-defined minimum limit $R_{min}$, and this rate is maintained until the time $t_8$ to begin increasing the bubble-up rate in anticipation of the next expected communication attempt 504*b* occurs.

As more time passes following a successful communication event, the probability of an occurrence of a communication attempt begins to increase, so the endpoint device can begin to increase its bubble-up rate accordingly. At time $t_8$, ¾ of the time to the next expected communication attempt has elapsed. The ¾ elapsed time period has been pre-defined in this embodiment as the point at which the endpoint will expect an increased likelihood of a communication attempt. Pursuant to decisions 424 and 432, and steps 434 and 436 (FIG. 4) the hold time counter is re-set to a rate increase step hold period $t_{si}$ 516. Beginning at time $t_8$, bubble-up rate R is incremented by decrementing the bubble-up timer by one down step $r_d$. In this example, down step $r_d$ is equal in magnitude to twice the up step $r_u$ ($r_d$=2$r_u$). Thus, during time period $t_9$-$t_8$, bubble-up rate R is maintained at $R_3$. Likewise, during the period $t_{10}$-$t_9$, bubble-up rate R is at rate $R_5$. At time $t_{10}$, bubble-up rate R is incremented again to the maximum bubble-up rate limit $R_{max}$, which corresponds to a minimum bubble-up timer limit. At its maximum rate $R_{max}$, bubble-up rate R facilitates the greatest probability of achieving a successful communication between the endpoint device and the AMR system.

At time $t_{11}$, communication attempt 506*b*$_1$ occurs resulting in successful communication 508*b*$_1$. A follow-up communication hold period $t_f$ 518 is observed. Also, time period $T_A$ between successful communications 508*b*$_1$ 508*a* is logged in the C&C queue according to steps 408, 410 (FIG. 4), and is used for calculating the time of the next expected communication attempt. At time $t_{12}$ an unexpected follow-up communication 506*b*$_2$ occurs resulting in successful communication 508*b*$_2$. In response, another follow-up communication hold period $t_f$ 520 is observed. In this example embodiment, the time period $T_B$ 524 between follow-up communication 508B$_2$ and communication 508*b*$_1$ is disregarded from the computation of the next expected communication attempt. The time of expected communication attempt 504*b* has been determined based on the averaging successful communication events occurring prior to communication 508*a*.

Because in this example, successful communication 508*b*$_1$ coincides with the time of expected communication attempt 504*b*, time duration $T_A$ is equal to the previously-computed average time durations between the relevant past communication events. Accordingly, the time of the next communication event 504*c* is expected to also occur at time $t_{14}$, which is at a time duration $T_A$ (indicated at 526) following communication event 508*b*$_1$. However, the next actual communication attempt 506*c* does not coincide with the expected communication attempt 504*c*. Instead, it occurs at a later time $t_{15}$, and results in successful communication 508*c*. The endpoint device logs time duration $T_C$ 528 for calculating the next expected communication attempt 504*d*. The next expected communication attempt 504*d* is expected at a time duration $T_D$ 530 following the previous successful communication 508*c*. Time duration $T_D$ 530 is somewhat longer than time duration $T_A$, but less than time duration $T_C$.

In the manner described above in this example embodiment, the bubble-up rate R is varied roughly in proportion to the expectation level of an occurrence of a future communication attempt 504. Over time, the bubble-up rate variation defines a bubble-up profile 500; bubble-up profile 500 being neither predetermined, nor fixed. Rather, bubble-up profile 500 dynamically varies depending on the occurrences or non-occurrences of communications events, and the relative timing between the communications events.

The above-described example operation cycle 400 (FIG. 4) is simply one way of realizing a dynamically adjustable bubble-up rate for an endpoint device according to one aspect of the present invention. Persons skilled in the art will appreciate that aspects of the present invention can be embodied in a variety of alternative embodiments. For example, an example endpoint device can compute an expectation function, over time, of a future occurrence of a communication event. The example endpoint device can then use the present expectation level to set the bubble-up rate. In this example embodiment, the bubble-up rate is varied more closely in proportion with the expectation function. In a related embodiment, the bubble-up rate is varied without regard to hold times. Hence, when viewed over time, the bubble rate profile will appear as a smoother function, without the step-wise bubble-up rate changes depicted in example bubble-up rate profiles 300 (FIG. 3A) and 500 (FIG. 5).

The invention may be embodied in other specific forms without departing from the essential attributes thereof; therefore, the illustrated embodiments should be considered in all respects as illustrative and not restrictive. The claims provided herein are to ensure adequacy of the application for establishing foreign priority and for no other purpose.

What is claimed is:

1. A method of operating an RF communicator adapted for an automatic meter reading (AMR) system, the method comprising:

maintaining the RF communicator in a low-power standby mode;

automatically responding to bubble-up events that are spaced apart by time durations, wherein the step-of responding includes initiating the RF communicator to exit the standby mode and enter into an active operating mode, and thereafter return to the standby mode;

automatically generating a new prediction of a time of occurrence of a future AMR system communication attempt with the RF communicator based on past communication activity;

automatically adjusting a time duration between successive bubble-up events based on the new prediction such that:

the time duration is made relatively shorter when the future AMR system communication attempt is predicted to occur close in time to the present time; and the time duration is made relatively longer when the future AMR system communication attempt is not predicted to occur close in time to the present time.

2. The method of claim 1, wherein the active operating mode includes operating in a mode that is receptive to communications directed at the communicator.

3. The method of claim 1, wherein the active operating mode includes transmitting information.

4. The method of claim 1, wherein the RF communicator is a radio transceiver.

5. The method of claim 1, wherein the communicator is part of an endpoint device operatively coupled to a utility meter.

6. The method of claim 1, wherein the automatically adjusting of the time duration is based on an occurrence/nonoccurrence of an event.

7. The method of claim 6, wherein the event is a reception byte communicator of a valid wakeup signal.

8. The method of claim 6, wherein the event is a successful communication involving the communicator.

9. The method of claim 1, wherein the automatically adjusting of the time duration between bubble-up events is included in the active operating mode.

10. The method of claim 1, wherein the time duration between successive bubble-un events is automatically adjusted to cause a bubble-up rate profile to approximately correspond to a potentially changing automatic meter reading practice.

11. A utility meter endpoint comprising:

a communication circuit adapted to communicate utility consumption-related information to an automatic meter reading (AMR) system;

a processor operatively coupled to the communication circuit;

memory operatively coupled to the processor and storing a set of instructions for operating the communication circuit, wherein the set of instructions includes:

activation instructions adapted to cause the processor to activate and deactivate the communication circuit according to a time interval; and adjustment instructions adapted to cause the processor to vary the time interval between successive activations such that the communication circuit is activated relatively more frequently when a time for a next expected communication event is relatively close in time to the present time, and the communication circuit is activated relatively less frequently when a time for a next expected communication event is relatively far in time from the present time.

12. The utility meter endpoint of claim 11, wherein the activation instructions are adapted to cause the utility meter endpoint to operate in a low power-consuming standby mode between activations of the communication circuit.

13. The utility meter endpoint of claim 11, wherein the time interval is an interval between successive activations of the communication circuit.

14. The utility meter endpoint of claim 11, wherein the adjustment instructions are adapted to vary the time interval according to a preconfigured profile of at least two values.

15. The utility meter endpoint of claim 11, wherein the set of instructions include setting instructions adapted to determine at least one value to which the time interval can be set by the adjustment instructions.

16. The utility meter endpoint of claim 11, wherein the set of instructions include statistics instructions adapted to maintain a record of communication activity, and wherein the set of instructions include determining instructions adapted to determine a time interval setting based on the maintained record.

17. The method of claim 1, wherein the automatically generating of the new prediction includes determining at least one previous time duration between successful communication events with the RF communicator, and projecting a time duration between a most recent past AMR system communication event and the future AMR system communication attempt with the RF communicator based on the at least one previous time duration.

18. The method of claim 1, wherein the memory further includes communication event prediction instructions adapted to:

maintain the time duration between successive bubble-up events at the relatively shorter duration for a predetermined holding time duration following a successful communication event with the RF communicator.

19. The utility meter endpoint of claim 11, wherein the adjustment instructions include instructions adapted to maintain the time interval such that the communication circuit is activated relatively more frequently for a predetermined duration following a successful communication event.

20. The utility meter endpoint of claim 11, wherein the set of instructions includes timing instructions that are adapted to cause the processor to predict a new time duration between a last communication event and the next expected communication event; and wherein the adjusting instructions utilize the time of the next expected communication event predicted by the timing instructions to cause the processor to vary the time interval.

* * * * *

UNITED STATES PATENT AND TRADEMARK OFFICE

CERTIFICATE OF CORRECTION

PATENT NO. : 7,298,288 B2
APPLICATION NO. : 11/118094
DATED : November 20, 2007
INVENTOR(S) : Christopher J. Nagy and Christopher L. Osterloh It is certified that error appears in the above-identified patent and that said Letters Patent is hereby corrected as shown below:

Column 3, line 61, after “is” please delete the “,”.

Column 5, line 41, please delete “correspond” and insert in its place --corresponds--.

Column 5, line 61, please delete “$t_1$” and insert in its place --$t_i$--.

Column 6, line 8, please delete “at a”.

Column 6, line 23, after “$T_1$” please delete “,”.

Column 11, line 15, after “above” please delete “with”.

Column 11, line 21, please delete “t1” and insert in its place --$t_1$--.

Column 11, line 23, please delete “t1” and insert in its place --$t_1$--.

Column 11, line 45, after “$t_7$-$t_6$” please insert --during which the--.

Column 12, line 67, after “bubble” please insert --up--.

Column 13, line 17, please delete “step of”.

Column 13, line 48, please delete “byte” and insert in its place --by the--.

Column 13, line 55, please delete “bubble-un” and insert in its place --bubble-up--.

UNITED STATES PATENT AND TRADEMARK OFFICE

CERTIFICATE OF CORRECTION

PATENT NO. : 7,298,288 B2
APPLICATION NO. : 11/118094
DATED : November 20, 2007
INVENTOR(S) : Christopher J. Nagy and Christopher L. Osterloh It is certified that error appears in the above-identified patent and that said Letters Patent is hereby corrected as shown below:

Column 14, line 28, please delete “statistics” and insert in its place --statistic--.

Signed and Sealed this

Eighth Day of July, 2008

JON W. DUDAS
*Director of the United States Patent and Trademark Office*